United States Patent Office 3,281,220
Patented Oct. 25, 1966

3,281,220
PREPARATION OF A FLUORINATED COMPOUND
Marion Douglas Meyers and Simon Frank, Stamford, Conn., assignors to American Cyanamid Company, Stamford, Conn., a corporation of Maine
No Drawing. Filed May 11, 1962, Ser. No. 195,024
10 Claims. (Cl. 23—359)

This invention relates broadly to the preparation of a fluorinated compound and, more particularly, to a new and useful method of preparing difluorocyanamide (1,1-difluorocyanamide), $F_2N—C\equiv N$.

Difluorocyanamide is a surprisingly stable compound. It is useful, for example, as an intermediate in the synthesis of other chemical compounds. For instance, it can be used as an intermediate in producing difluorodiazirine as disclosed and claimed in the copending application of one of us (Marion Douglas Meyers), Serial No. 195,022, filed concurrently herewith. The properties of difluorocyanamide are tabulated below:

| | |
|---|---|
| Molecular weight (by gas density) | Calcd., 78. Found: 82±5. |
| Boiling point | −66±3° C. by extrapolation from vapor pressure measurements. |
| $F^{19}$ nuclear magnetic resonance spectrum | One broad peak with triplet character at $\phi = -70.9$ p.p.m.[1] |
| Infrared spectrum— | |
| Absorption, $\mu$: | Assignment |
| 4.48 weak | $C\equiv N$. |
| 7.85 weak | C—F impurity (?). |
| 9.72 (triplet) strong | Predominantly symmetric $NF_2$. |
| 11.18 (doublet) strong | Predominantly asymmetric $NF_2$. |
| 11.83 (triplet) medium | Predominantly C—N. |
| Mass spectrum | Shows strong 78 peak. |

Reacts slowly with Hg.

[1] G. Filipoxich and G. V. D. Tiers, J. Phys. Chem., 63, 761 (1959).

No pertinent prior art is known.

The present invention is based on our discovery that 1,1-difluorocyanamide (hereafter for brevity often referred to as "DFC") can be readily and economically produced by contacting an aqueous liquid mass comprising essentially cyanamide with gaseous fluorine ($F_2$). This aqueous mass can be in the form of a solution or a dispersion. The term "solution" as used hereinafter with reference to the aqueous liquid mass comprising or consisting essentially of cyanamide is intended to include within its meaning dispersions unless it is clear from the context that a specific meaning is intended. Ordinarily the aqueous liquid mass contains, by weight, from about 2% to about 85%, more particularly from about 10% to about 50%, of cyanamide (based on anhydrous cyanamide).

At the end of the reaction period the reaction products including difluorocyanamide are collected by any suitable means, for instance in a series of traps maintained at appropriate temperatures. When the reaction products including DFC also contain other products, for example $CO_2$, to form a mixture that has utility as such, then it may be unnecessary to isolate the DFC from the reaction products. (An example of a use of the DFC–$CO_2$ mixture is in isomerizing DFC as described in the aforementioned Meyers copending application). However, for most purposes, after the products of reaction have been collected, the DFC is isolated therefrom by suitable technique, for example, by co-distillation in known manner.

The concentration of the cyanamide in the aqueous liquid mass containing the same can be varied widely. Whether or not the said liquid mass is in the form of a solution or dispersion depends, for example, upon the solubility of the cyanamide in water at the particular temperature or range of temperatures employed in carrying out the reaction. Tabulated below are the solubility characteristics of cyanamide in water at various temperatures:

| Temperature, °C. | Substratum (Solid Phase) | Percent by Weight of Anhydrous Cyanamide in Water |
|---|---|---|
| −0.62 | Ice | 2.58 |
| −3.96 | Ice | 9.42 |
| −7.58 | Ice | 18.40 |
| −12.72 | Ice | 30.9 |
| −16.6 | Eutectic | 37.8 |
| −15.6 | $NC-NH^2$ | 38.75 |
| −14.39 | $NC-NH^2$ | 40.19 |
| −2.49 | $NC-NH^2$ | 56.80 |
| +14.50 | $NC-NH^2$ | 77.20 |
| 25.6 | $NC-NH^2$ | 87.15 |
| 37.90 | $NC-NH^2$ | 96.77 |
| 42.9 (M.P.) | | 100 |

The temperature at which the fluorination of the cyanamide is carried out will generally range from about −15° C. to about +40° C., more particularly from about 0° C. to about +30° C. Of course the use of higher temperatures is not precluded. Good results have been obtained by fluorinating the cyanamide while the aqueous liquid mass containing the cyanamide is at a temperature within the range of from about +5° C. to about +15° C.

The fluorination of cyanamide in an aqueous liquid mass with gaseous fluorine to produce difluorocyanamide is more easily controlled by diluting the fluorine gas with an inert carrier gas. Any suitable inert carrier gas can be used, for example, helium, argon, nitrogen, neon, etc. The concentration of the gaseous fluorine in the diluent gas can be varied as desired or as conditions may require, for example, from 10:90% by volume of the gaseous fluorine to 90:10% by volume of the diluent gas. Good results have been obtained when the concentration of the gaseous fluorine in the diluent gas, specifically helium, constituted from about 15% to 35% by volume of the mixed gases.

The fluorination of the cyanamide in an aqueous liquid mass (solution and/or dispersion) can be carried out either in the presence or absence of a buffering agent. We prefer to add a buffering agent to the aqueous liquid mass containing the cyanamide whereby the said mass is maintained at a pH within the range of from about 4.0 to about 7.0 during the reaction period. Better yields are obtained when a buffer is used.

The buffering agent can be added intermittently or continuously to the cyanamide solution, but preferably is introduced into the said solution at the beginning of the fluorination reaction. When the preferred technique is employed the buffering agent is preferably added in an amount which is in excess of its solubility in the aqueous cyanamide solution whereby the excess amount of buffering agent precipitates.

Any suitable buffering agent can be employed. Good results have been obtained by using a mixture of (a) an alkali-metal dihydrogen phosphate, specifically sodium dihydrogen phosphate, and (b) a di-(alkali-metal) monohydrogen phosphate, specifically disodium monohydrogen phosphate. Instead of the aforesaid sodium hydrogen phosphates one can use corresponding mixtures of any of the other mono- and dihydrogen phosphates of the alkali metals (potassium, lithium, cesium and rubidium) or mixtures of any of these other alkali-metal hydrogen phosphates with each other or with sodium hydrogen phosphates.

Illustrative examples of other buffering agents that can be used in practicing the present invention are:

Mixtures of $H_3BO_3$ and $Na_2B_4O_7 \cdot 10H_2O$
Aqueous solutions of $H_3BO_3$ and $NaOH$
Aqueous solutions of $NaH_2PO_4$ and $NaOH$
Aqueous solutions of $NaH_2PO_4$ and $Na_2B_4O_7 \cdot 10H_2O$ The amount of buffering agent employed is such as will maintain a pH within the range of from about 4.0 to about 7.0 in the aqueous liquid mass containing cyanamide during the reaction period.

One of the principal advantages of the present invention is that is provides an economical method of producing 1,1-difluorocyanamide wherein, in most cases, the only contaminant in significant amount (see Examples 1 through 6 which follow) is $CO_2$. The desired product, 1,1-difluorocyanamide, is easily separated if it is desired to do so, from the $CO_2$; or, as pointed out hereinbefore, the mixture of 1,1-difluorocyanamide and $CO_2$ has utility as such.

In order that those skilled in the art may better understand how the present invention can be carried into effect, the following examples are given by way of illustration and not by way of limitation. All percentages are by weight unless otherwise stated.

*Example 1*

Into a polyethylene reactor surrounded by an ice bath is introduced 150 ml. of a 50% aqueous cyanamide solution (pH of 5.2). The reactor is provided with inlet and outlet tubes, the inlet tube being placed a little below the surface of the cyanamide solution. A stream of an inert carrier gas, specifically helium, diluted with fluorine ($F_2$) is then bubbled through the solution for 1 hour. The concentration of $F_2$ in the gas stream varies between about 15% and about 35% by volume. The total amount of $F_2$ charged is about 120 mmoles. The volatile gases pass through an ice-cooled trap and then through two $-196°$ C. cold (liquid nitrogen) traps. After the reaction time of 1 hour the pH of the solution is 4.2. The total amount of volatile product found in the $-196°$ C. traps is 5 mmoles. Fractional co-distillation by the method of Cady et al. (Anal. Chem., 31, 618 (1959)) and infrared examination establishes that the aforementioned volatile product consists essentially of a mixture of DFC (about 40%) and $CO_2$ (about 60%).

*Example 2*

To a 300 ml. round-bottomed flask having a 24/40 ST joint is added 46 ml. (44 g.) of a 50% aqueous cyanamide solution. To this solution is added an aqueous slurry (buffering agent) prepared in the following manner:

Seventeen (17) g. $NaH_2PO_4 \cdot H_2O$ mixed with 45 g. $Na_2HPO_4 \cdot 12H_2O$ is slurried with 5 ml. of water. Some of this phosphate slurry dissolves in the cyanamide solution but most of it settles to the bottom of the flask.

The flask is fitted with an inlet tube extending approximately 3 cm. below the surface of the liquid, the pH of which is 5.6. An exit tube positioned above the liquid surface and extending out of the flask leads downstream to four cold traps (two at $-78°$ C. and two at $-196°$ C.) for isolation of the volatile fluorination products.

The 300 ml. flask is surrounded by a large beaker of water at about $9°$ C. A stream of helium is started bubbling through the solution in the flask at a rate of about 700 ml./min. Slowly $F_2$ is mixed with the helium stream until, after about 3–4 minutes, a flow of about 40 ml./min. is attained. These helium and fluorine flow rates are maintained throughout the reaction period. The water bath srurounding the reaction flask is maintained between $9°$ C. and $12°$ C. by adding small amounts of ice. After 55 minutes the solution (pH of 4.9) becomes dark red-orange in color and the flow of $F_2$ is stopped.

Isolation of the product retained in the two cold traps at $-196°$ C. by vacuum-line technique (bulb-to-bulb distillation) yields 20 mmoles of product. Infrared analysis indicates that the composition of the product is approximately 70% DFC and 30% $CO_2$. Traces of other products amount to 1% or less of the total product. From a bulb containing 7.5 mmoles of the crude product is obtained 5.4 mmoles of pure DFC by the preparative fractional co-distillation technique used in Example 1.

*Example 3*

Example 2 is repeated exactly, including the same flow rates, with the exception that the time of reaction and the bath temperature are as shown below, wherein also is shown the yield of crude product and its composition.

| Time in Minutes | Bath Temp., $°$ C. | Yield of Crude Product, mmoles | Composition of Crude Product, Approx. |
| --- | --- | --- | --- |
| 62 | 7–12 | 22.7 | 65% DFC 35% $CO_2$ |
| Run is interrupted and later continued on the same solution. | | | |
| [1] 30 | 9–12 | [2] 18.3 | 70% DFC 30% $CO^2$ |

[1] Additional time, making the total time 92 minutes.
[2] Additional yield, so that the total yield of crude product is 41.0 mmoles.

*Example 4*

Same as in Example 2 with the exception that, instead of using helium as the inert carrier gas, neon is employed. Similar results are obtained.

*Example 5*

The apparatus and general procedure are essentially the same as described under Example 1.

An aqueous solution containing 10% by weight of cyanamide is prepared by adding 13 ml. of a 50% aqueous cyanamide solution to 52 ml. of water, thereby obtaining 65 ml. of a 10% aqueous cyanamide solution. This solution is used instead of the 50% aqueous cyanamide solution employed in Example 1. Other differences from the conditions used in Example 1 are as follows:

The rate of flow of gaseous fluorine is about 30 ml./min. while that of the helium is about 220 ml./min. The temperature throughout the reaction period varies between $0°$ C. and $4°$ C. The reaction is continued for a total of 4 hours and 14 minutes.

A total of 65 mmole of product is collected. Infrared spectra and fractional co-distillation as described under Example 1 shows that the product has a composition of approximately 50% DFC and approximately 50% $CO_2$.

*Example 6*

Same as in Example 5 with the exception that the aqueous cyanamide solution employed contains about 75% by weight of cyanamide and the reaction temperature varies between about $10°$ C. and about $20°$ C. Similar results are obtained.

*Example 7*

The apparatus and general procedure are essentially the same as described in the preceding examples with the following exceptions:

To a 3-necked 500 ml. round-bottomed flask is added 250 ml. of an approximately 50% aqueous cyanamide solution. Mechanical stirring is used to agitate the solution. Fifteen (15.0) g. boric acid ($H_3BO_3$) and 95.3 g. $Na_2B_4O_7 \cdot 10H_2O$ are dissolved in the cyanamide solution to buffer the solution during the reaction period. The rate of flow of gaseous fluorine is 58 ml./min. while the rate of flow of helium is 500 ml./min. The reaction is continued for a total of 2½ hours. A total of 10 mmoles of product is obtained. Infrared spectra and fractional co-distillation as described under Example 1 show that its composition is about 55% DFC, about 28% $HNF_2$ and a trace of $CO_2$.

We claim:

1. The method of preparing 1,1-difluorocyanamide which comprises contacting an aqueous liquid mass comprising essentially cyanamide with gaseous fluorine; and collecting the reaction products including 1,1-difluorocyanamide.

2. A method as in claim 1 wherein the aqueous liquid mass comprising essentially cyanamide is at a temperature within the range of from about −15° C. to about +40° C. during the reaction period.

3. A method as in claim 1 wherein the aqueous liquid mass comprising essentially cyanamide is maintained at a pH within the range of from about 4.0 to about 7.0 during the reaction period.

4. A method as in claim 1 wherein the aqueous liquid mass contains, by weight, from about 2% to about 85% of cyanamide.

5. The method of preparing 1,1-difluorocyanamide which comprises contacting, with gaseous fluorine, an aqueous liquid mass containing cyanamide in an amount corresponding to from about 2% to about 85% by weight of the said mass; collecting the products of the reaction; and isolating 1,1-difluorocyanamide from the reaction products.

6. A method as in claim 5 wherein the gaseous fluorine is diluted with an inert carrier gas.

7. A method as in claim 5 wherein the aqueous liquid mass comprising essentially cyanamide is one that has been buffered with a mixture of (a) an alkali-metal dihydrogen phosphate and (b) a di-(alkali-metal) monohydrogen phosphate whereby the said liquid mass is maintained at a pH within the range of from about 4.0 to about 7.0 during the reaction period.

8. A method as in claim 7 wherein the alkali-metal dihydrogen phosphate of (a) is sodium dihydrogen phosphate and the di-(alkali-metal) monohydrogen phosphate of (b) is disodium monohydrogen phosphate.

9. A method as in claim 7 wherein the aqueous liquid mass comprising essentially cyanamide is one which contains, by weight, from about 10% to about 50% of cyanamide and is at a temperature within the range of from about 0° C. to about +30° C. during the reaction period.

10. The method of preparing 1,1-difluorocyanamide which comprises bubbling gaseous fluorine diluted with helium through an aqueous liquid mass containing approximately 50% by weight of cyanamide, said liquid mass being at a temperature within the range of from about +5° C. to about +15° C. during the reaction period and being buffered with a mixture of sodium dihydrogen phosphate and disodium monohydrogen phosphate whereby the said liquid mass is maintained at a pH within the range of from about 4.0 to about 7.0 during the reaction period; collecting the products of the reaction; and isolating 1,1-difluorocyanamide from the reaction products.

No references cited.

OSCAR R. VERTIZ, *Primary Examiner.*

M. WEISSMAN, *Assistant Examiner.*